Dec. 28, 1926.
E. L. JOHNSON
PUSH CAR
Filed July 30, 1926
1,611,915
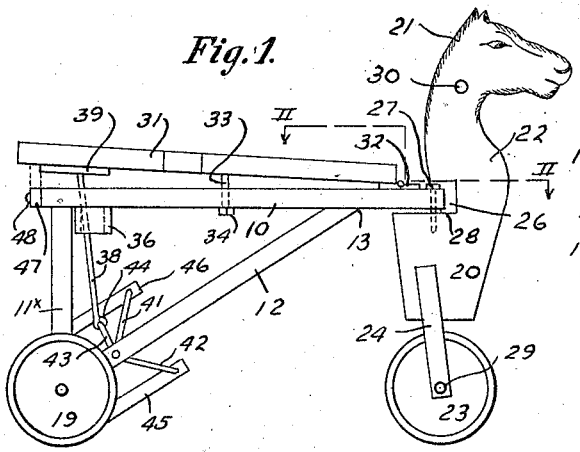
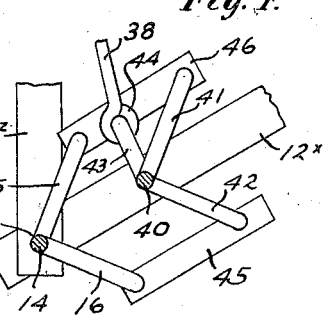
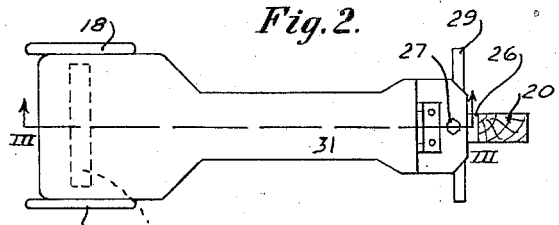
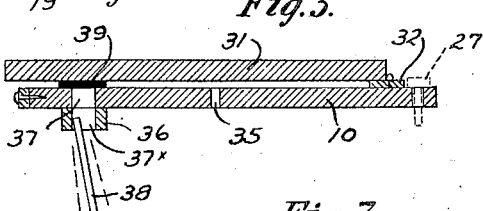
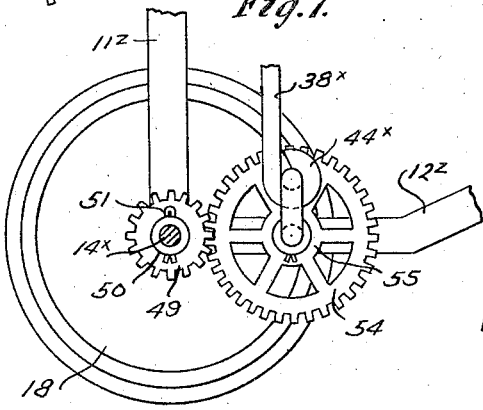
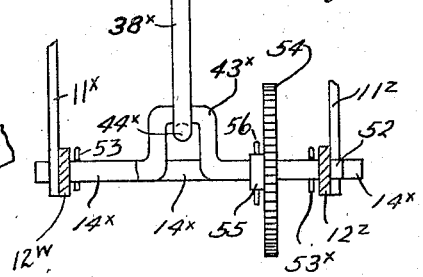
INVENTOR
BY Edwin L. Johnson
William C. Edwards ATTORNEY Patented Dec. 28, 1926.

1,611,915

UNITED STATES PATENT OFFICE.

EDWIN L. JOHNSON, OF KANSAS CITY, MISSOURI.

PUSH CAR.

Application filed July 30, 1926. Serial No. 125,920.

The invention relates to a child's toy vehicle. Safety against overturning is obtained by employing three wheels, the forward wheel supporting a vertical member formed preferably to imitate the head of a horse. The two rear wheels support the main body portion and there is a pivoted connection between the forward guiding portion of the vehicle and the main body portion, for steering purposes.

The rear wheels are rigid with the rear axle member which rotates in bearings in sideframe supporting members. Hinged to the horizontal body member of the vehicle and behind the point of pivot is a seat element. Means carried by the rear axle drive means connected to a forward countershaft element. The forward shaft is provided with a crank element carrying a rod, said rod being driven in an up and down direction during rotation of the rear wheels. This rod strikes against a pad on the under side of the hinged seat and gives the seat an upward toss, which as the rod moves downwardly permits the seat to drop to its lower level. Thus the child astride the push car is bounced up and down as he rides his toy horse and experiences the sensation of horseback riding.

In the drawings; Fig. 1 is a side elevation of the push car showing the hinged seat in the maximum raised position. Fig. 2 is a sectional view taken along the line II—II Fig. 1 looking in the direction of the arrows. Fig. 3 is a sectional view taken along the line III Fig. 2, showing the driven rod at the bottom of its stroke movement, the dotted lines indicating the side limits of the sweep of the rod under crank actuated movements. Fig. 4 is a side view of the crank shaft axle, the paired connecting rods, the forward crank shaft and upright rod, as seen in Fig. 1 with the rear wheels and the right hand braces and frame supporting members removed for clearness of illustration. Fig. 5 is an elevation of the main driving crank shaft. Fig. 6 is an elevation of the driven forward crank shaft. Fig. 7 is a side view of the driven rod as actuated by an alternate gear driven mechanism. Fig. 8 is a front view of the gear and crank shaft carrying the driven rod seen in Fig. 7. Similar numerals of reference indicate corresponding parts throughout all the figures of the drawings.

Referring to the drawings; the horizontal main body frame member preferably a wooden slab 10 is supported at the rear by an inverted U-shaped strap iron member having legs $11^x$, $11^z$ connected by a base portion $11^y$. A pair of inclined braces 12 and $12^x$ lead from the bottom of the legs $11^x$ and $11^z$ and attach to the under side of the forward portion of the member 10 at 13. An axle 14 having a pair of U-shaped bends 15 and 16 preferably positioned at 90° apart as seen in Fig. 4, has its outer ends housed as at 17 in holes through the leg and brace elements and in which holes as bearings, said axle is adapted to rotate. A pair of wheels 18 and 19 are rigid with the shaft 14 at its opposite ends, as in Fig. 2.

At 20 is a vertical member, which in its preferred form will be fashioned something like the head 21 of a horse having a neck portion 22. A wheel 23 is rotatable on its axle being arranged within the side plates or forks 24 which rigidly depend from the forequarter of the member 20. At 26 the neck portion is cut away to support and receive the forward end of the member 10. The bolt 27 passes through the member 10 to engage the base 28 of the slot 26. Thus there is a pivoted steering connection at 27 between the members 10 and 20 as will be readily understood, or so that the horse's head may be turned to either side. Outwardly projecting from the axle of the wheel 23 are foot supports 29, 29, while handles like 30 project from either side of the head 21.

The seat 31 for the child, covers the member 10 and is hinged thereto at 32 behind the pivoted connection 27. A bolt 33 having a head 34 is attached and suspended from the under central portion of the seat 31, passing through an opening or slot guide 35 in the member 10. In the view Fig. 1 the head 34 contacts the base member 10 thus limiting the upward toss of the hinged seat 31.

At 36 is a block secured to the underside of the member 10 or so as to thicken the member 10 at that point. Slots 37 and $37^x$ through the members 10 and 36 pass the rod 38. At 39 is a pad or plate affixed to the under side of the seat 31 and against which the end of the rod 38 strikes as later explained.

A second crank shaft 40 has its opposite ends housed to rotate in holes provided in the braces 12, $12^x$; this shaft 40 is positioned above and forward of the axle 14 and carries a pair of U-shaped bends 41 and 42, preferably positioned at an angle of 90° with respect to each other, while an intermediate U-shaped bend is shown at 43 positioned at an acute angle with respect to crank 41 and an obtuse angle with respect to crank 42. The lower hooked end 44 of the rod 38 engages the crank 43. The lower hooked end 44 may be formed similar to a connecting rod bearing if so desired. Connecting rods 45 and 46 connect cranks 16—42 and 15—41.

The child astride the seat 31 moves the vehicle forward or backward by a walking movement of his feet upon the ground, thus rotating the wheels 18, 19 and the axle 14 to actuate the rods 45 and 46 to rotate the shaft 40, whereby the crank 43 rotates and moves the rod 38 up and down in the slots 37, 37$^x$. If the member 10 is made of sufficient thickness the block 36 is eliminated. On an upward movement from the position seen in Fig. 3, the end of rod 38 strikes the pad 39 to upwardly toss the hinged seat 31 and the child, to the position seen in Fig. 1; on the downward stroke of the crank 43, the pad 39 drops towards the body 10, the upper end of the rod 38 continuing downward to the end of its stroke so that the end of the rod 38 is preferably not in contact with the pad 39. This allows for a time interval between successive tossing seat movements.

In Figs. 7 and 8 the means for driving the rod 38$^x$ which is the same as rod 38 includes a rear shaft 14$^x$ differing from shaft 14 by omission of the cranks 15 and 16 and upon which a gear 49 has its hub 50 keyed by cotter pin 51 to the shaft 14$^x$. Braces 12$^w$, 12$^z$ corresponding to braces 12, 12$^x$ connect between the shaft 14$^x$ and the member 10. A forward crank shaft 52 housed at its ends in holes through the members 12$^w$ and 12$^z$, as bearing supports, is provided with a crank element 43$^x$ to which the hooked end of rod 38$^x$ engages as at 44$^x$. Cotter pins 53 align the shaft 14$^x$ intermediate its bearing supports. Cotter pins 53$^x$ align the shaft 52 between its bearing supports. At 54 is seen a gear enmesh with gear 49 and having its hub 55 pinned at 56 to shaft 52. As the wheels 18, 19 rotate, the small gear 49 drives gear 54 to drive crank 43$^x$ to actuate the rod 38$^x$ to strike the pad 39 to lift the seat 31 as previously described.

Thus the child experiences the sensation of horseback riding by the continued tossing and dropping of the hinged seat. Sometimes a child might prefer a more quiet ride, in this case I provide a button 47 pivotally mounted on a bolt 48 carried at the rear end of the member 10. The button is arranged in a horizontal position or omitted when the tossing is desired, while if turned vertically or as indicated in the dotted position Fig. 1, the button 48 will support the seat in a stationary position, since the rod 38 would not occasion any tossing movement, the seat being already at the top of the stroke of the rod.

Such modifications may be employed as lie within the scope of the appended claims.

Having fully described my invention, what I now claim as new and desire to secure by Letters Patent is;

1. A toy vehicle of the class described comprising a horizontal body member, a forward vertical member pivotally connected to said body member; a wheel supporting the vertical member; braces and frame supports for said body member, an axle and supporting rear drive wheels rigid thereto housed in bearings on the frame supporting members; a crank shaft forward of the axle rotatably housed in bearings in the brace members; means on the axle engaging means on the crank shaft for transmitting drive wheel rotation to said crank shaft; an upright rod engaging crank means on the crank shaft; a seat member hinged to the forward end of the body member and covering the body member rearwardly therefrom; a slot through the body member passing the upright rod; said rod under drive wheel rotation acting to strike and toss the hinged seat for the purposes specified.

2. A toy vehicle of the class described comprising a horizontal body member, a forward vertical member pivotally connected to said body member; a wheel supporting the vertical member; braces and frame supports for said body member, an axle and supporting rear drive wheels rigid thereto housed in bearings at the intersection of brace and frame supports, crank means on said axle; a second crank shaft forward of the axle rotatably housed in bearings in the brace members, connecting rods linking the cranks of the axle to the cranks of the second shaft; the second shaft having a third crank portion, an upright rod attached thereto; a seat member hinged to the upper forward end of the body member and covering the said body member rearwardly therefrom; a slot through the body member passing the upright rod; said rod under drive wheel rotation acting to strike and lift the hinged seat for the purposes specified.

3. A toy vehicle of the class described having a pair of drive wheels at the rear and a single wheel at the front, means for pivotally turning the wheel at the front for steering purposes; a body frame; a seat hinged thereto behind the point of pivot; a rod for striking successive blows upon the under side of the hinged seat, a crank shaft engaging said rod and means for transmitting drive wheel rotation to occasion crank shaft rotation to actuate said rod.

4. A toy vehicle of the class described having a pair of drive wheels at the rear and a single wheel at the front, means for pivotally turning the wheel at the front for steering purposes; means for transmitting power from the drive wheels; a body frame, a seat hinged thereto, a rod for striking successive blows upon the under side of the hinged seat and crank means and connecting rods linking said rod to the power driving means for the purposes specified.

5. In a vehicle of the class described; a body member horizontally disposed, a seat member above the body member, a hinge connecting the forward end of said seat to said body member; a pad attached to the under rear portion of the seat; a slot in the body member beneath the pad; a rod slidably arranged within the slot, adapted under driven rod movements to rise and strike successive blows upon said pad to occasion alternate tossing and dropping hinged movements of said seat with respect to said body member.

6. In a vehicle of the class described, a horizontal body member and a seat member hinged thereto, a slot through the body member, a rod passing said slot, a pad on the under face of said seat and means for driving said rod to occasion a successive series of striking blows upon said pad and means for limiting hinged movement of said seat as tossed by said rod actuated blows.

7. A child's toy vehicle comprising two rear drive wheels, a front steering wheel, a vertical member supported by the front wheel; a body member pivotally connected to the vertical member; a crank shaft axle rigid with the drive wheels, frame supports housing said axle as bearings and supporting said body member above the same; brace members leading from the axle to the forward portion of the body member; a second crank shaft housed to rotate in bearings provided on said brace members; connecting rods linking the rear crank means to the crank means on the second shaft, each set of crank means being positioned at 90° with respect to each other; a third crank on the second shaft positioned at an acute angle to one of the adjacent crank members and at an obtuse angle with respect to the other adjacent crank member; an upright rod carried by the third crank; a seat hinged above and to the forward end of the body member, a pad under the seat; a slot in the body member passing the upright rod; a bolt attached to the under side of the seat, passing throught the body member and with a head adapted to contact the under side of the body member at an extreme separation of the seat and body members under hinged action; said rod under drive wheel rotation operating to strike successive blows upon said pad to raise the hinged seat and to permit said seat to drop between blows for the purposes of the invention.

In testimony whereof I affix my signature.

EDWIN L. JOHNSON.